(12) United States Patent
Lee et al.

(10) Patent No.: US 7,004,156 B2
(45) Date of Patent: Feb. 28, 2006

(54) METHOD FOR DETERMINING INTAKE PORT FLOW IN AN INTERNAL COMBUSTION ENGINE

(75) Inventors: Byungho Lee, Columbus, OH (US); Jesse Michael Gwidt, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 22 days.

(21) Appl. No.: 10/881,207

(22) Filed: Jun. 30, 2004

(65) Prior Publication Data

US 2006/0000461 A1 Jan. 5, 2006

(51) Int. Cl.
*F02D 41/18* (2006.01)

(52) U.S. Cl. ............... 123/698; 123/295; 701/108
(58) Field of Classification Search ............... 123/698, 123/295; 701/108
See application file for complete search history.

(56) References Cited

U.S. PATENT DOCUMENTS

| | | | |
|---|---|---|---|
| 5,714,683 A | 2/1998 | Maloney | |
| 5,753,805 A | 5/1998 | Maloney | |
| 5,845,627 A | 12/1998 | Olin et al. | |
| 6,155,227 A | * 12/2000 | Shimada et al. | 123/295 |
| 6,176,227 B1 | * 1/2001 | Ohuchi et al. | 123/698 |
| 6,631,704 B1 | * 10/2003 | Ogawa et al. | 701/104 |
| 2002/0017270 A1 | * 2/2002 | Atago et al. | 123/698 |
| 2002/0104508 A1 | * 8/2002 | Atago et al. | 123/295 |

* cited by examiner

Primary Examiner—Erick Solis
(74) Attorney, Agent, or Firm—Christopher DeVries (57) ABSTRACT

An internal combustion engine adapted for combustion of stoichiometric and non-stoichiometric air/fuel mixtures includes an intake system, a combustion chamber which is adapted for direct injection of a fuel and an exhaust system. The intake port flow output comprises an intake airflow output and an EGR airflow output. An intake port flow estimator determines an intake port gas flow output from the intake mass airflow input of the intake airflow into the intake manifold and the EGR mass airflow input of the EGR airflow of the EGR airflow into the intake manifold using a plurality of engine parameters and an air/fuel adjustment factor. The intake port gas flow output is determined as an effective intake airflow output and an effective EGR airflow output. The effective intake airflow output to the combustion chamber is used to determine an effective mass of intake air output per cylinder. The effective mass of intake air output per cylinder is used to determine a fuel input to the combustion chamber in accordance with a commanded air/fuel ratio.

27 Claims, 9 Drawing Sheets

METHOD FOR DETERMINING INTAKE PORT FLOW IN AN INTERNAL COMBUSTION ENGINE

TECHNICAL FIELD

The present invention is related to the field of engine controls for internal combustion engines. More particularly, this invention is related to intake port flow as used in such controls. Most particularly, this invention is adapted to determine intake port flow as a plurality of constituent mass airflows.

BACKGROUND OF THE INVENTION

Internal combustion engine fueling, exhaust gas recirculation and canister purge control require an accurate measure of the rate at which fresh air is being ingested into the engine cylinders. "Mass airflow" as it is commonly referred to must be determined in order that the air/fuel ratio be controlled to a predetermined ratio in accordance with well known performance and emissions objectives. This is true whether the fuel is metered to individual cylinders such as with well known port fuel injection or with single point fuel injection, the former requiring even more stringent requirements in the accuracy and responsiveness of the mass airflow estimates. Generally, it has been desirable to control the amount of fuel metered such that a stoichiometric ratio of 14.6/1 air to fuel is achieved. This has been primarily due to emissions considerations in modern automobiles which employ three-way catalytic converters for treating undesirable exhaust gas constituents. The stoichiometric fuel/air ratio results in little or no oxygen in the exhaust gas that is recirculated in the exhaust gas recirculation (EGR) system. Thus, traditional port flow models generally ignore the contribution of oxygen in the exhaust gas that is recirculated through the EGR system.

Advances in engine control technology and exhaust gas treatment technology have increased the use of lean-burn engines which operate at non-stoichiometric (e.g., higher) air/fuel ratios. In lean-burn engines the amount of oxygen in the exhaust gas is significant. Therefore, traditional port flow models may incorrectly predict the effective in-cylinder air to fuel ratio significantly. For example, where the intake port airflow comprises 40% returned through the EGR system, using a lean-burn air/fuel ratio of 30/1 can result in an inaccurate port flow estimate and fuel input, resulting in an actual in-cylinder air/fuel ratio of 40/1. Since lean-burn engines typically require even more precise control of the air/fuel ratio than traditional engines, the failure of traditional port flow models to accurately predict the mass airflow associated with the EGR has a significant impact on the performance of these engines.

Therefore, it is desirable to establish a method of determining intake port mass airflow output that is suitable for use with lean-burn internal combustion engines and that is adapted to accurately estimate the intake port airflow output to the combustion chamber for both stoichiometric and non-stoichiometric operating conditions.

SUMMARY OF THE INVENTION

The present invention is a method of determining an intake port mass airflow in an internal combustion engine having an intake system, a combustion chamber comprising a cylinder which is adapted for direct injection of a fuel and an exhaust system, the engine adapted for combustion of stoichiometric and non-stoichiometric air/fuel mixtures, the intake system having an intake air throttle to throttle an intake airflow input into an intake manifold for distribution to an intake port having an intake valve for directing an intake port airflow output into the combustion chamber, the combustion chamber operatively connected to the exhaust system for removal of an exhaust airflow through an exhaust port having an exhaust valve and an exhaust gas recirculation (EGR) conduit which is adapted to return a portion of the exhaust airflow through an EGR valve as an EGR airflow input into the intake manifold. The method comprises the steps of: determining an intake mass airflow input of the intake airflow input into the intake manifold; determining an EGR mass airflow input of the EGR airflow input into the intake manifold; determining a plurality of engine state parameters related to the intake airflow and the EGR airflow into the intake manifold; and determining an effective intake mass airflow output of the intake airflow out of the intake manifold into the intake port using the intake mass airflow input, the EGR mass airflow input, the engine state parameters and an air/fuel adjustment factor. The effective intake mass airflow output can be used to determine an effective mass of intake air for each cylinder, which in turn may be used to determine the fuel charge for each cylinder.

The method may also be used to determine the entire gas flow output from the intake manifold by determining an effective intake mass airflow output and an effective EGR airflow output from the intake manifold.

The present invention is particularly advantageous in that it permits the determination of the effective intake airflow and the fueling of the engine using readily available engine state parameters. It is also advantageous in that it is adapted to determine a more accurate estimate of the air actually available for combustion under lean-burn combustion conditions than prior methods, and thus is adapted to more accurately calculate the fuel required to achieve a commanded air/fuel ratio under such conditions. The method improves the accuracy of the estimate of combustible air by taking into consideration the combustible air available from the EGR airflow, particularly under lean-burn conditions.

BRIEF DESCRIPTION OF THE DRAWINGS

The present invention will be more fully understood from the accompanying drawings, in which.

DESCRIPTION OF THE PREFERRED EMBODIMENT

Figure 1:
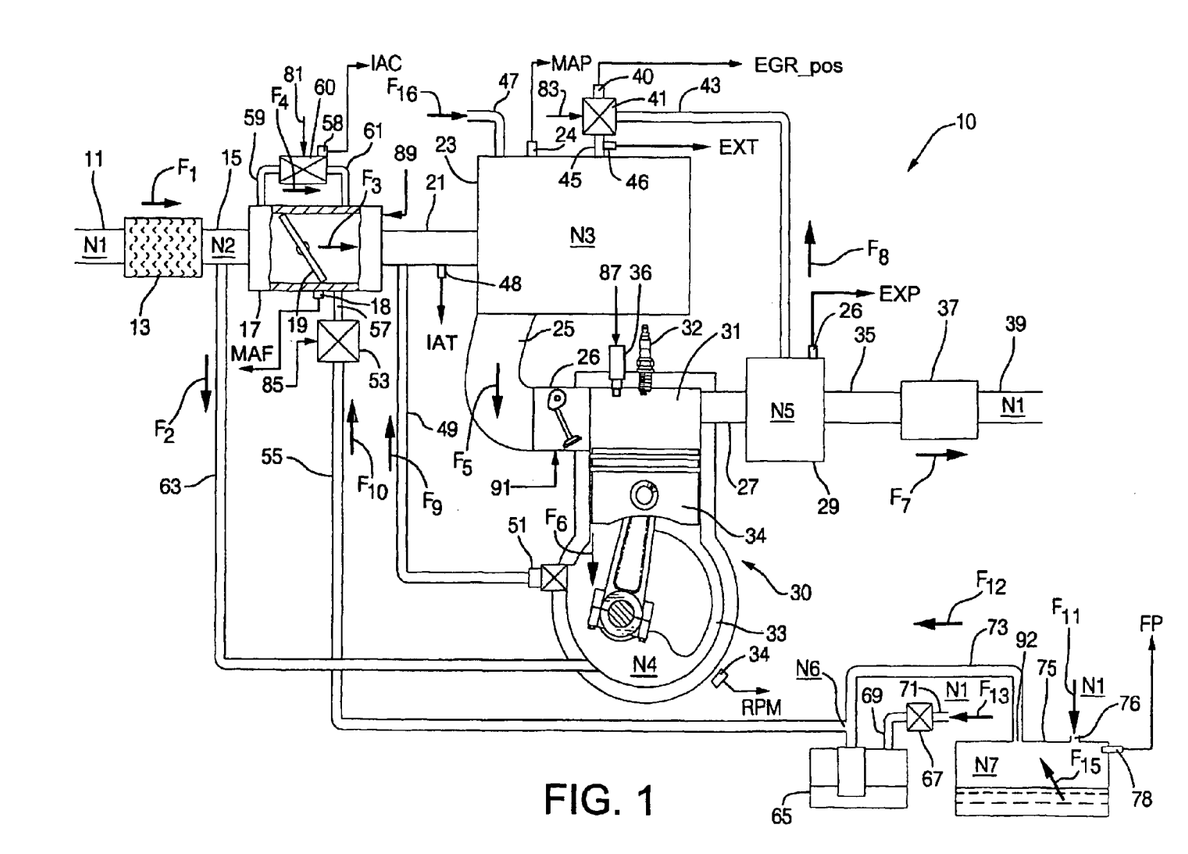
FIG. 1 is a schematic illustration of an internal combustion engine adapted for use in conjunction with the present invention.

Referring to FIG. 1, a conventional direct injection internal combustion engine system 10 is illustrated to which control is applied in accordance with the embodiment of the invention described herein. The engine system is reticulated into an interdependent network of gas mass flows designated by arrows labeled as $F_1$–$F_{16}$ between a network of pneumatic volume nodes designated as N1–N7. Inlet air at atmospheric pressure at node N1 passes through fresh air inlet 11 through air cleaner 13 as flow $F_1$ and into intake duct 15 at node N2. The inlet or intake air is drawn through throttle body 17 (as flow $F_3$) in which is rotatably disposed an inlet or intake air valve 19 in the form of a throttle plate, the position of which is manually or electronically controlled through air throttle position signal 89 to vary restriction to inlet air passing through the throttle body and into intake duct 21 for input into intake manifold 23 at node N3. This flow is referred to herein as intake airflow input. In this embodiment, a conventional mass airflow meter 18 is exposed to the intake air along flow path $F_3$ in throttle body 17, and transduces a mass airflow output signal MAF. In this embodiment, a conventional pressure transducer 24 is exposed to gas pressure in the intake manifold 23 and transduces such pressure into output signal MAP.

Individual cylinder intake runners (corresponding to the number of cylinders of engine system 10), one runner 25 being illustrated in FIG. 1, open into the intake manifold 23 and into the combustion chamber of respective engine cylinders, one combustion chamber 31 of one respective cylinder 30 being shown in FIG. 1. Each cylinder, such as cylinder 30, includes a combustion chamber, such as combustion chamber 31 and a crankcase, such as crankcase 33, separated by a piston, such as piston 34 which substantially sealingly engages the wall of the cylinder 30. A quantity of fuel is injected, via conventional fuel injector 36 into combustion chamber 31, in response to a fuel injection command signal 87 applied thereto, for mixing with the gases, including fresh inlet or intake air from intake duct and exhaust or EGR gases, such gases or gas flows also being referred to herein as air or airflows, from the EGR conduit, from intake manifold 23 which are drawn into and through the intake runner and port 25 as output flow $F_5$ during a cylinder intake event during which an intake valve 26 is driven to an open position and during which a low pressure condition is present in the combustion chamber 31. The air/fuel mixture is ignited in the combustion chamber 31 during a combustion event initiated by a timed ignition arc driven across the spaced electrodes of spark plug 32 which extends into the combustion chamber 31. The piston 34 within the cylinder 30 is reciprocally driven under the effective pressure of the combustion event for driving vehicle wheels, accessory loads, etc., as is generally understood in the art. Exhaust gases produced in the combustion process within the combustion chamber 31 are exhausted from the combustion chamber 31 during a cylinder exhaust event and through exhaust runner 27 to exhaust manifold 29 at node N5. In this embodiment, a conventional pressure transducer 42 is exposed to gas pressure in the exhaust manifold 29 and transduces such pressure into output signal EXP. The exhaust gases pass through the exhaust manifold 29 to exhaust duct 35 leading to catalytic treatment device and muffler (generally illustrated as element 37) and then to the atmosphere at the pressure of node N1.

Vacuum is selectively applied to the cylinder crankcase 33 at node N4 through a positive crankcase ventilation (PCV) conduit 49 including a standard PCV valve 51. The PCV conduit is connected between the crankcase 33 and the intake duct 21, establishing the vacuum for drawing blow-by gases that have been driven from the cylinder combustion chamber 31 to the crankcase 33 under the pressure of the combustion process. A supply of fresh inlet or intake air from node N2 is provided to the crankcase 33 via a fresh air conduit 63 connected between the intake duct 15 and the crankcase 33. The PCV valve selectively draws the blow-by gases from the crankcase for mixing with intake air for consumption in engine cylinders for purifying engine system lubricants.

Figure 7:
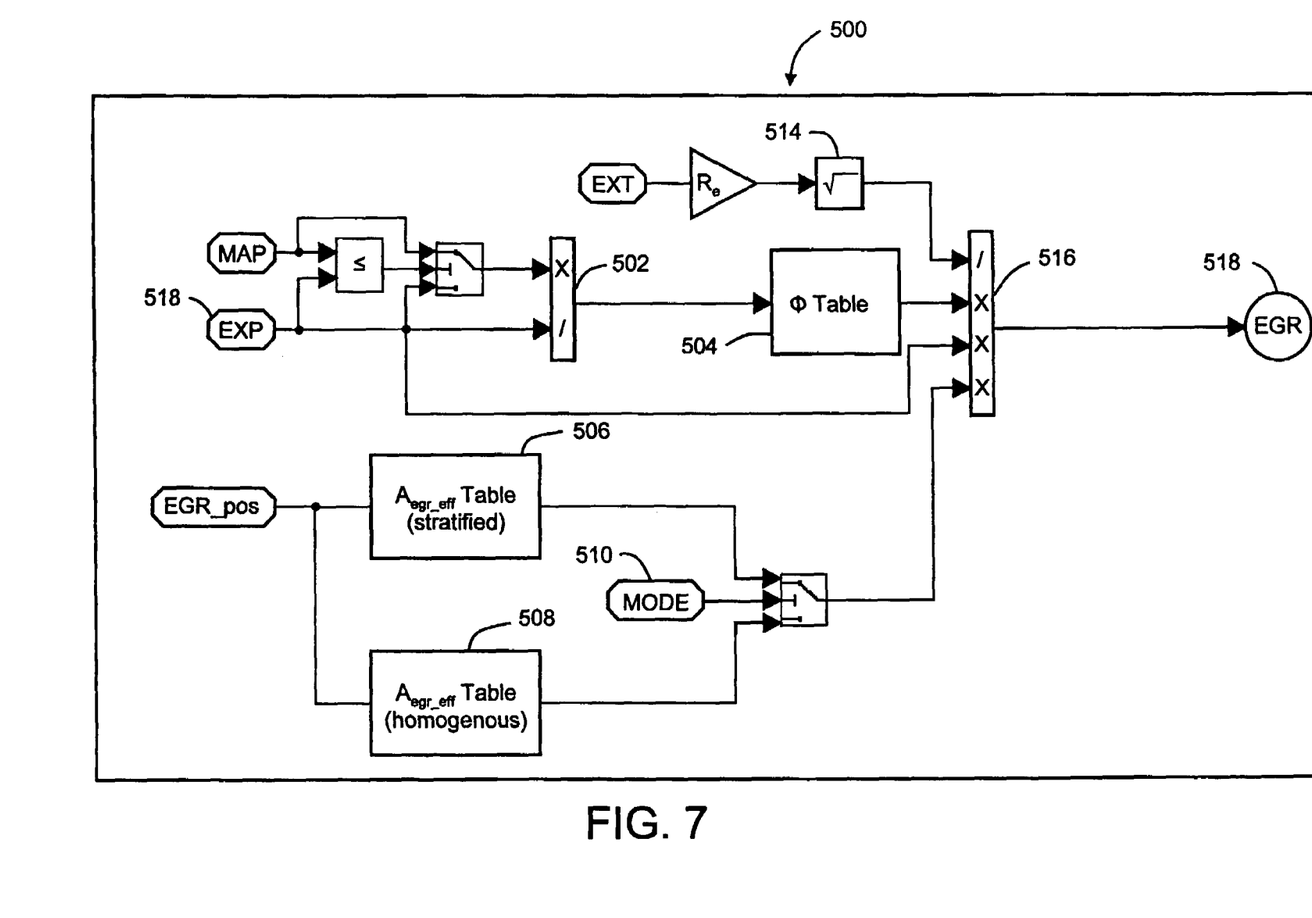
FIG. 7 is block diagram of block 500 of FIG. 5.

A portion of the exhaust gases shown as flow $F_8$, referred to herein as exhaust gas recirculation airflow, are drawn from the exhaust manifold 29 at node N5 through an exhaust gas recirculation (EGR) conduit 43 and through an EGR valve 41. EGR valve may be of any suitable type, such as an electrical solenoid type responsive to an EGR position control signal on line 83 and further through a conduit 45 where it comprises an input into the intake manifold 23 at node N3 for mixing with inlet or intake air for delivery to the engine cylinder combustion chambers. This EGR airflow from conduit 45 is referred to herein as the EGR airflow input. In this embodiment, a conventional position sensor 40 is adapted to transduce the position of EGR valve into an output signal, EGR_pos. The state or mode of the EGR valve is controlled electronically as is generally understood in the art in response to general operating conditions to vary the dilution of the fresh inlet air with substantially inert exhaust gas to provide for a change in the engine emissions component of oxides of nitrogen (NOx). Referring also to FIG. 7, engine system 10 is adapted to operate under lean-burn conditions, wherein the air to fuel ratio is increased from the stoichiometric ratio of 14.6/1 to ratios of up to about 40/1, such as by techniques of stratified charge fueling and other engine fueling techniques which are well-known. In conjunction with lean-burn operation, in addition to changes in the spark timing, fueling timing and other variables associated with engine operation, the EGR valve position is preferably altered from a position associated with stoichiometric or homogeneous operation to a position or positions associated with lean-burn or stratified operation, so as to further affect the desired lean burn air/fuel ratios, as described herein.

A portion of inlet air having an associated flow $F_4$ may also be routed through conduits 59 and 61 having a conventional idle air bypass valve 60 therebetween, such as a solenoid type valve, which is responsive to an idle air command (IAC) signal on line 81, for bypassing the restriction of the inlet air valve 19 within the throttle body 17 under certain generally-known control conditions such as idle operating conditions in which precise control of relatively low fresh air flow rates is required. In this embodiment, a conventional pressure transducer 58 is exposed to gas pressure in the idle air bypass valve and transduces such pressure into output signal IAC.

Brake boost conduit 47 of any conventional type may also open into intake manifold 23 at node N3 providing for a minor gas flow $F_{16}$ during application of a conventional service brake pedal of an automotive vehicle (not shown), as is well-known in the art.

Vehicles equipped with well-known evaporative emission controls may also have gas flow through a canister purge valve 53 and canister purge conduits 55 and 57 into throttle body 17 downstream, according to the normal direction of flow through the throttle body 17, of the inlet air valve 19 with the actual effective flow into intake manifold at node N3. Charcoal canister 65 generally releases fuel vapors when fresh air is drawn through purge vent 67 and purge vent conduits 69 and 71. Fuel tank 75 may also release fuel vapors which may be absorbed in canister 65, may be released thereby, or may pass directly to the engine along with released fuel vapors through conduit 55 at node N6 for consumption in the described cylinder combustion process. Fuel tank 75 having a supply of fuel therein at node N7 may include a leak orifice 76 through which fresh air may enter the fuel tank. Conventional pressure transducer 78 is disposed within the fuel tank 75 for transducing vapor pressure within the tank into an output signal FP. Fuel vapor passes as flow $F_{12}$ from the fuel tank 75 through a conventional rollover orifice 92 and to the canister 65 via tank vapor recovery conduit 73.

Disposed between the above-described nodes are flow paths including flow path $F_1$ across the air cleaner 13 between nodes N1 and N2, flow path $F_2$ along PCV fresh air conduit 63 between nodes N2 and N4, flow path $F_3$ through throttle body 17 across the inlet air valve 19 from node N2 to intake duct 21, flow path $F_4$ through idle air bypass conduits 59 and 61, flow path $F_5$ through the intake runner 25 between node N3 and the cylinder combustion chamber 31, flow path $F_6$ between the combustion chamber and the crankcase (node N4) of an engine cylinder 30, flow path $F_7$ to the atmosphere at node N1 through catalytic treatment device and muffler elements 37 and exhaust ducts 35 and 39, flow path $F_8$ through EGR conduits 43 and 45 between node N5 and the EGR valve 41, flow path $F_7$ through the PCV conduit 49 between node N4 and the intake duct 21 (effectively at node N3), flow path $F_{10}$ through the conduit 55 between node N6 and the throttle body 17 (effectively at node N3), flow path $F_{11}$ through leak orifice 76 into fuel tank 75 between nodes N1 and N7, flow path $F_{12}$ from fuel tank 75 across rollover orifice 92 and through conduit 73 between nodes N7 and N6, flow path $F_{13}$ across purge vent 67 into purge canister 65 between nodes N1 and N6, fuel vaporization flow path $F_{15}$ within fuel tank 75, and flow path $F_{16}$ through the brake boost conduit 47 between the braking system (not shown) and the node N3.

Figure 2:
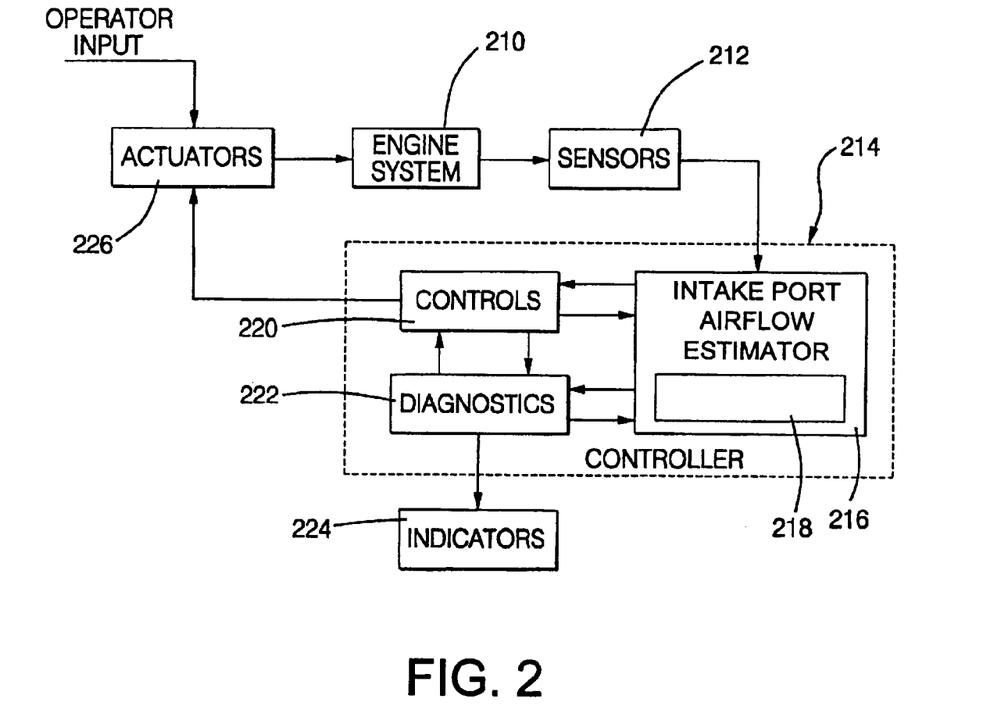
FIG. 2 is a schematic illustration of an engine control adapted for use in conjunction with the present invention.

Referring to FIG. 2, a general diagram illustrating engine system control and diagnostics includes an engine system 210, such as the engine system of FIG. 1, having various engine state parameters transduced by various conventional sensors 212 into signals applied to a controller 214 which includes an intake port airflow estimator 216 comprising a control algorithm 218 which is adapted to carry out a method or process comprising a sequence of operations or steps and to determine the intake port mass airflow output in accordance with the present invention. The intake port mass airflow output is provided from the intake port airflow estimator 216 together with certain of the engine state parameters to various controls 220, for example for controlling engine fueling, inlet air rate or mass airflow, pressure, EGR rate or mass airflow, and to various diagnostic procedures 222 for diagnosing certain engine control systems using the pressure and flow information. The controls 220 may issue control signals to drive various engine system control actuators 226 as illustrated in FIG. 1, such as fuel injectors 36 using fuel injector signal 87, intake air throttle body 17 and the intake air valve 19 position using intake air valve position signal 89, IAC valve 60 using air control valve signal 81, EGR valve 41 using EGR valve position signal 83, etc. in accordance with generally available control strategies. Manual operator inputs may further be applied to such actuators, as is generally understood in the art. The diagnostics 222 interact with the controls according to standard control and diagnostic procedures and may provide diagnostic information to various conventional indicators 224, such as lamps or chimes. The controller 214 takes the form of a conventional single-chip microcontroller in this embodiment including such conventional elements as a central processing unit, an input-output unit, and memory devices including random access memory RAM devices, read only memory ROM devices and other standard elements.

Figure 3:
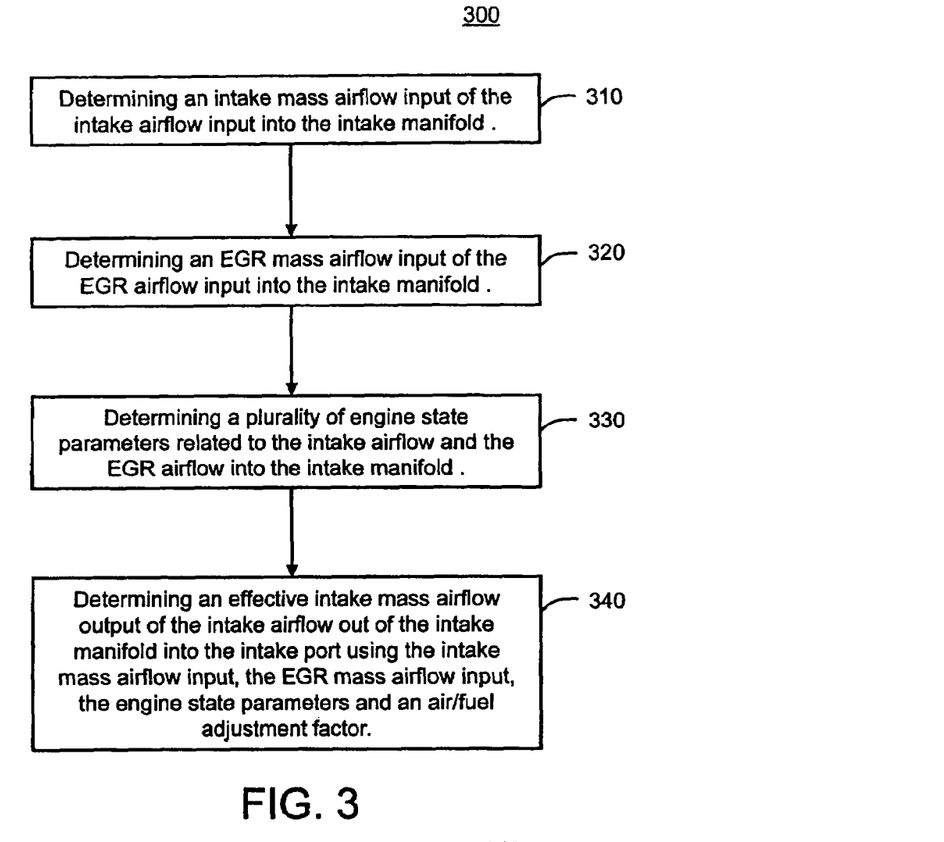
FIG. 3 is a flow chart illustrating steps of the method of the present invention.
Figure 4:
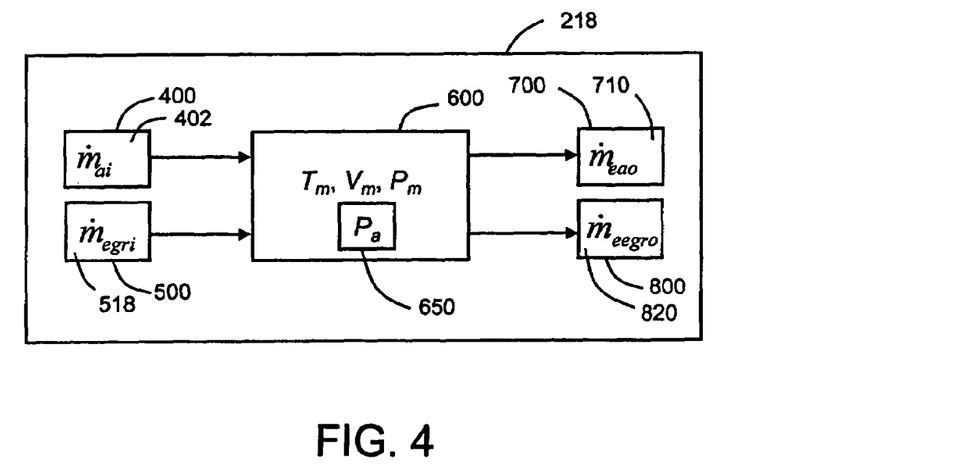
FIG. 4 is a schematic illustration of the mass airflows associated with the port flow estimator and method of the present invention.
Figure 5:
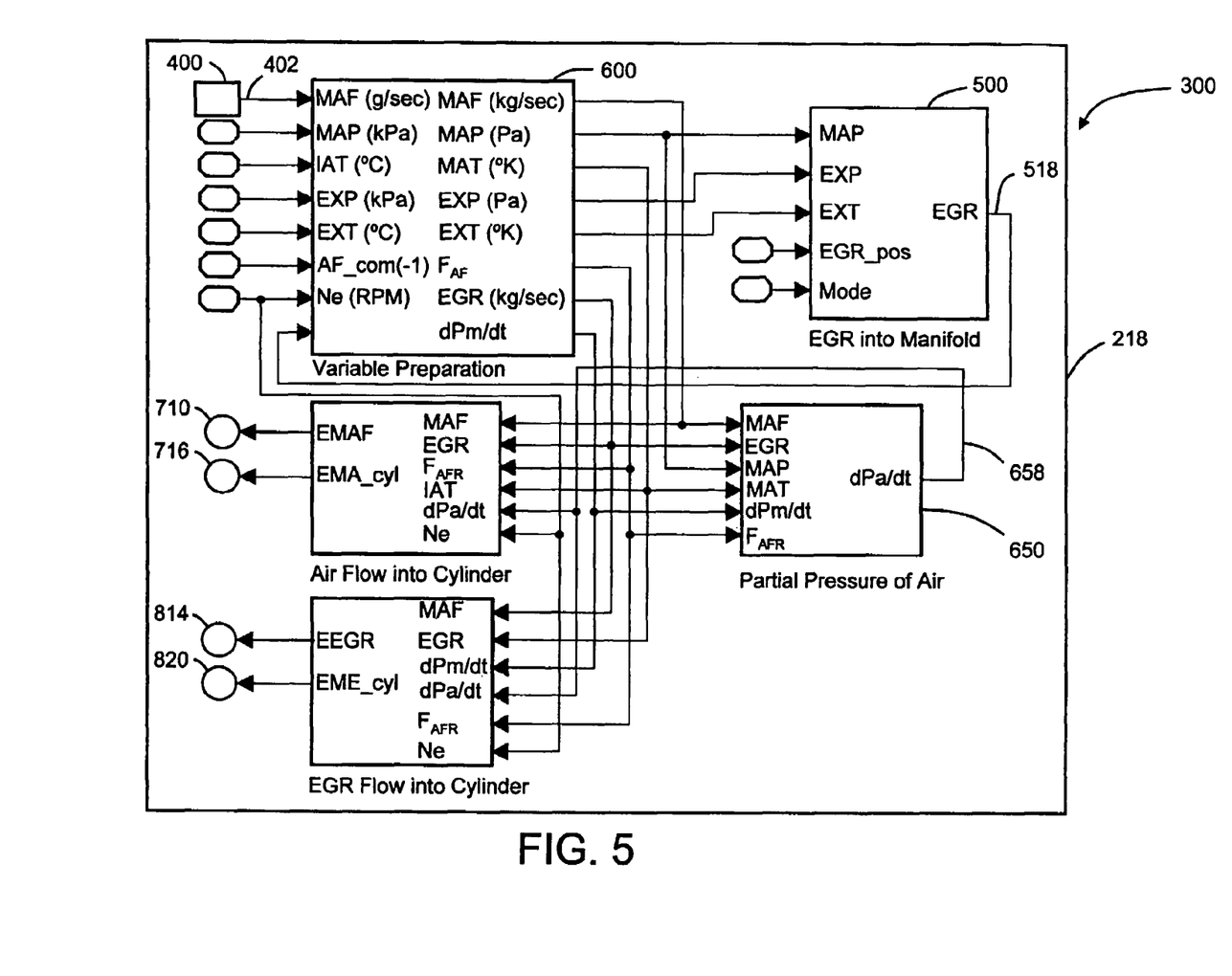
FIG. 5 is a block diagram of the port flow estimator and method of the present invention.

Referring to FIGS. 3–5, the present invention is a method 300 of determining an intake port mass airflow in an internal combustion engine 10 having an intake system, a combustion chamber 31 which is adapted for direct injection of a fuel and an exhaust system, the engine adapted for combustion of stoichiometric and non-stoichiometric air/fuel mixtures, the intake system having an intake air throttle 17 to throttle an intake airflow input (F3) into an intake manifold 23 for distribution to an intake port 25 having an intake valve 26 for directing an intake port airflow output into the combustion chamber 31, the combustion chamber 31 operatively connected to the exhaust system for removal of an exhaust airflow (F8) through an exhaust port having an exhaust valve and an exhaust gas recirculation (EGR) conduit 45 which is adapted to return a portion of the exhaust airflow through an EGR valve 41 as an EGR airflow input into the intake manifold, the method comprising the steps of: determining 310 an intake mass airflow input 402 of the intake airflow input into the intake manifold 23, as illustrated in block 400; determining 320 an EGR mass airflow input 518 of the EGR airflow input into the intake manifold 23, as illustrated in block 500; determining 330 a plurality of engine state parameters related to the intake airflow and the EGR airflow into the intake manifold, as illustrated in block 600; and determining 340 an effective intake mass airflow output 710 of the intake airflow out of the intake manifold into the intake port using the intake mass airflow input 402, the EGR mass airflow input 518, the engine state parameters and an air/fuel adjustment factor 610.

Referring to FIGS. 2–10, the steps of method 300 associated with intake port flow estimator 216 are preferably performed as a plurality of steps in a computer control algorithm 218 adapted for execution in a computer, such as that found in controller 214. Referring to FIGS. 4–5, method 300 may also be understood as a method of port flow estimation which utilizes the primary input mass airflow contributions into the intake manifold, namely a first input comprising an intake mass airflow input 402 from block 400, and a second input comprising an EGR mass airflow input 518 from block 500 to determine an effective intake mass airflow output 710 from the intake port from block 700. The intake mass airflow input 402 and EGR mass airflow input 518 are treated as separate airflows (each taking into account the effect of the other) within intake manifold in conjunction with the estimation, and are separately adjusted for dynamic state conditions within the intake manifold using a plurality of state parameters from block 600 related to the intake manifold dynamics to determine an effective intake mass airflow output 710 from the intake manifold from block 700 and an effective EGR mass airflow output 814 from block 800. Because the primary contribution of available combustible air is associated with the intake mass airflow input 402, and the EGR mass airflow input 518 generally only contributes combustible air to the intake manifold under lean-burn conditions, the intake mass airflow input 402 is used to determine an effective input mass airflow output 710 by adjusting the intake mass airflow output by adding an air/fuel adjustment term that is representative of the combustible air available from the EGR mass airflow input. The air/fuel adjustment term may be calculated by factoring the EGR mass airflow input 518 by an empirically determined air/fuel ratio adjustment factor 610 that is a function of an air/fuel ratio command associated with the EGR mass airflow input 518. The effective intake mass airflow output 710 may be used to fuel the engine by calculation of an effective intake air mass output 716 per cylinder. A desired air/fuel ratio command, $AF_{com(0)}$, and the effective intake air mass output per cylinder, $\dot{m}_{eao\_cyl}$, may be used to determine a desired mass of fuel and fueling command per cylinder.

The port flow estimation method 300 of the present invention incorporates several assumptions. First, method 300 assumes that the gases inside the intake manifold obey the ideal gas law. Secondly, method 300 also assumes the gases inside the intake manifold, including the intake mass airflow input 402 and the EGR mass airflow input 518, obey Dalton's law. Thirdly, method 300 assumes that the intake mass airflow input 402 and the EGR mass airflow input 518 are completely mixed with one another within the intake manifold. Fourthly, method 300 assumes that the temperature and pressure of the gas mixture within the intake manifold are substantially homogeneous.

One embodiment of the steps of the port flow estimation method 300 is described below, as well as a number of equations utilized in conjunction with the steps of the method. The nomenclature associated with the terms or expressions used herein and their definitions are provided below. Generally, the nomenclature used in the equations is provided first and the nomenclature used in the figures is provided second. As used herein, the nomenclature associated with defined terms is generally italicized.

$AF_{com(-1)}$ An air/fuel ratio command associated with a prior combustion control cycle and associated with a particular EGR mass airflow input.

$AF_{com(0)}$ An air/fuel ratio command associated with a desired air/fuel ratio for a current combustion control cycle.

$AF_{stoich}$ An air/fuel ratio of approximately 14.6/1.

k: A calculated value where $$k = \frac{nV_d}{4\pi V_m}.$$

$M_a$: The molecular weight of air.

$M_{egr}$: The molecular weight of EGR gas.

$m_{am}$: The mass of intake air within the intake manifold.

$m_{eao\_cyl}$, EMA_cyl: The effective mass of intake air out of the intake manifold and into a cylinder.

$m_{eegro\_cyl}$: The effective mass of EGR gases out of the intake manifold and into a cylinder.

$\dot{m}_{ai}$, MAF: The mass flow rate of intake air into the intake manifold.

$\dot{m}_{am}$: The mass flow rate of intake air within the manifold.

$\dot{m}_{ao}$: The mass flow rate of air out of the intake manifold and into the intake port(s).

$\dot{m}_{eao}$, EMAF: The effective mass flow rate of air out of the intake manifold.

$\dot{m}_{cyl}$ The mass flow rate of air and EGR gas into the cylinder.

$\dot{m}_{egri}$, EGR: The mass flow rate of EGR gas into the intake manifold.

$\dot{m}_{egro}$: The EGR mass flow rate of EGR gas out of the intake manifold.

$\dot{m}_{eegro}$, EEGR: The effective mass flow rate of EGR gas out of the intake manifold.

n: The number of cylinders of the engine.

$P_a$: The partial pressure of the intake air from the intake airflow input in the intake manifold.

$P_{egr}$: The partial pressure of EGR gas from the EGR airflow input in the intake manifold.

$P_{exh}$, EXP: The exhaust manifold pressure.

$P_m$, MAP: The intake manifold pressure.

$\dot{P}_a$, $dP_a/dt$: The rate of change of $P_a$ as a function of time.

$\dot{P}_m$, $dP_m/dt$: The rate of change of $P_m$ as a function of time.

$\rho_m$: The density of the gas mixture in the intake manifold, comprising the intake airflow input and the EGR airflow input.

$R_a$ The universal gas constant adjusted for the molecular weight of air $$\left(\frac{R_u}{M_a}\right).$$

$R_e$ The universal gas constant adjusted for the molecular weight of the exhaust gas comprising the EGR airflow $$\left(\frac{R_u}{M_{egr}}\right).$$

$R_u$: The universal gas constant.

$T_{exh}$, EXT: The temperature of the exhaust gases in the EGR conduit from the exhaust manifold.

$T_m$, MAT: The temperature of the gases in the intake manifold, comprising the intake airflow input and the EGR airflow input.

$\dot{T}_m$ The rate of change of the temperature of the gases in the intake manifold comprising the intake airflow input and the EGR airflow input.

$V_d$: The cylinder displacement volume.

$V_m$: The intake manifold volume.

$\omega_e$: The engine angular velocity (rad/sec).

Intake Mass Air Flow into Intake Manifold

Referring to FIGS. 1, and 3–5, method 300 includes a step of determining 310 an intake mass airflow input 402, $\dot{m}_{ai}$, of the intake airflow input into the intake manifold, and is illustrated in FIGS. 4 and 5 as block 400. The intake mass air flow input 402 into the intake manifold may be a calculated or measured quantity, but is preferably a measured quantity that is measured using a conventional mass airflow meter, such as mass airflow meter 18, which is adapted to provide an output signal MAF (see FIGS. 1, 4 and 5).

EGR Mass Airflow Input into Intake Manifold

Referring to FIGS. 1, and 3–5, determining 320 an EGR mass airflow input of the EGR airflow input 518, $\dot{m}_{egri}$, into the intake manifold 23 is illustrated in conjunction with block 500. The EGR mass air flow input 518 into the intake manifold 23 may be calculated or measured using a conventional mass airflow meter, but is preferably a calculated quantity. In order to calculate the EGR mass airflow input 518, the EGR valve can be assumed to operate like other valves with a compressible fluid, and may be calculated using the compressible flow equation with respect to choking, comprising:

$$\dot{m}_{egr\_max} = \frac{\rho_{exh} A_o}{\sqrt{R_e(T_{exh})}} \sqrt{k} \left[\frac{2}{k+1}\right]^{\frac{.5(k+1)}{(k-1)}} \quad (1)$$

$$= \frac{.6847 * \rho_{exh} * A_o}{\sqrt{R_e * T_{exh}}}, \quad \text{where}$$

$$k = \frac{nV_d}{4\pi V_m} \quad \text{for an ideal gas.}$$

The relationship set forth in equation 1 describes the behavior of a fully opened valve with an area $A_0$. However, as illustrated in FIGS. 1 and 7 and described herein, it is desirable to operate the EGR valve in different modes corresponding to the operating modes of engine 10. Therefore, if engine 10 is operating in a homogeneous mode, it is desirable to set the EGR valve 41 position (via EGR position signal 83) to a corresponding homogeneous mode position, and if engine 10 is operating in a stratified mode, it is desirable to set the EGR valve position to a corresponding stratified mode position. Typically, when the engine 10 is operating in a homogeneous mode, the EGR valve position is such that the effective area of the valve is less than when the engine is operating in a stratified mode. The density of the exhaust gases passing through the EGR valve can be determined experimentally as a function of $P_m$ and $P_{exh}$ by using equation 2 below and holding $A_0$, $R_e$, and $T_{exh}$ constant and varying the ratio of the exhaust manifold pressure, $P_{exh}$, to the intake manifold pressure, $P_m$.

$$\rho_{exh} = P_{exh} * f\left(\frac{P_m}{P_{exh}}\right) \quad (2)$$

$$= P_{exh} * \Phi, \quad \text{where:}$$

$$\Phi = f\left(\frac{P_m}{P_{exh}}\right).$$

Then $\Phi$ can be incorporated into control algorithm 218 as an empirically determined look-up table to provide density as a function of $P_m$ and $P_{exh}$, as described herein.

Once the relationship for $\Phi$ is established, the EGR mass airflow input 518, $\dot{m}_{egri}$ or EGR, to the manifold is available when the EGR valve is in the fully opened valve position with a flow path area of $A_0$, which generally corresponds to operation of engine 10 in the stratified mode. To establish a relationship for the EGR mass airflow input 518 to the manifold 23 which includes a partially open EGR valve, equation 1 may be used, keeping $\rho_e$, $R_e$ and $T_{exh}$ constant and experimentally varying the EGR valve opening to determine an effective area as a function of the EGR valve position, according to the relationship comprising:

$$A_{egr\_eff} = f(EGR\_pos). \quad (3)$$

Substituting into equation 1, an equation for EGR mass airflow into the manifold may be determined as a function of EGR_pos, $P_m$, $P_e$ and $T_{exh}$, as follows:

$$\dot{m}_{egri} = \frac{\Phi * A_{eff}}{\sqrt{R_e * T_{exh}}} \quad (4)$$

$$= \frac{\Phi * EGR\_pos}{\sqrt{R_e * T_{exh}}}.$$

Referring now to FIGS. 5 and 7, the calculation of EGR mass airflow input 518, $\dot{m}_{egri}$, in accordance with equation 4 is illustrated in conjunction with block 500 of port flow estimator algorithm 218. For each control cycle or loop of estimator algorithm 218, associated values of engine state parameters $A_{egr\_eff}$, $P_m$, $P_{exh}$ and $T_{exh}$ for that control loop are obtained from engine 10 as signal inputs EGR_pos, MAP, EXP and EXT. A ratiometric relationship of $P_m$ and $P_{exh}$ is determined by applying the mathematical operators shown in block 502 and a corresponding value of $\Phi$ may be determined from the ratiometric relationship using look-up table 504. The possible values of EGR_pos or $A_{egr\_eff}$ may be defined as a look-up table, or preferably a plurality of look-up tables, such as look-up tables 506 and 508, corresponding to a stratified mode and homogeneous mode of operation of engine 10, respectively. The actual EGR_pos is selected as shown in block 512 from one of the plurality of look-up tables, such as look-up tables 506 or 508, as a function of the engine 10 operating mode input 510, MODE, such that a signal indicative of a stratified mode of engine 10 operation causes the selection of $A_{egr\_eff}$ from look-up table 506, and a signal indicative of a homogeneous mode of engine 10 operation causes the selection of $A_{egr\_eff}$ from look-up table 508. Other modes of engine 10 operation and associated look-up tables for EGR_pos and $A_{egr\_eff}$ may be defined within the scope of the present invention. The sensed value of EXT is multiplied by the value of $M_e$, which is preferably a stored or calibration value which is associated with algorithm 218 using known methods, and the square root of their product is taken as illustrated in block 514. The mathematical operators of block 516 are applied to the respective values obtained from blocks 504, 512 and 514, as well as the sensed input value of EXP, and a value of the EGR mass airflow input 518, $\dot{m}_{egri}$ or EGR, for the control loop is calculated in accordance with the relationship comprising equation 4.

Referring to FIGS. 1, 3, 5 and 6, method 300 also includes a step of determining 330 a plurality of engine state parameters related to the intake airflow input and the EGR airflow input into the intake manifold 23. These parameters may be used to calculate the effective intake mass airflow output, $\dot{m}_{eao}$, as described herein. This is illustrated in conjunction with block 600 in FIGS. 4–6. In the embodiment illustrated, the plurality of engine state parameters to be determined comprises an intake manifold air temperature $T_m$ or MAT, an intake manifold air volume, $V_m$, an intake manifold air pressure, $P_m$ or MAP and a partial pressure of the intake airflow in the intake manifold, $P_a$. Referring to block 602 in FIG. 6, MAT may be calculated using $\dot{m}_{ai}$ or MAF, from MAP, EGR, IAT and EXT using the Ideal gas law and a perfect mixing assumption. For a given vehicle, $V_m$ is a generally a constant determined by the design of the intake manifold, and may be incorporated into algorithm 218 as a stored or calibration value within controller 214. The intake manifold air pressure, $P_m$ or MAP, may be measured using air pressure sensor 24, as described herein. The partial pressure of the intake airflow in the intake manifold, $P_a$, may be calculated as described hereinbelow, and illustrated in conjunction with block 650 in FIGS. 4, 5 and 8. In addition, when calculating the effective air mass output per cylinder, $m_{eao}$, the engine state parameters may include the engine speed and number of cylinders of the engine, as well as a calibration associated with 2 or 4 cycle operation. Further, when the EGR mass airflow input 518, $\dot{m}_{egri}$, is calculated in accordance with equation 4 and block 500 of FIG. 7, it is desirable that engine state parameters also comprise $A_{egr\_eff}$, $P_{exh}$ and $T_{exh}$ as described herein. The value of $A_{egr\_eff}$ may be determined empirically as described herein. The values of $P_{exh}$ and $T_{exh}$ may be measured using pressure sensor 46 and temperature sensor 26, respectively, as shown in FIG. 1.

Referring again to FIG. 6, the plurality of engine state parameters may also be used in conjunction with variable preparation in the calculation of certain intermediate values used in conjunction with method 300. As illustrated in block 604, the value of $\dot{P}_m$ or $dP_m/dt$ may be calculated using the engine speed signal, RPM, and the change in the manifold pressure signal, MAP, occurring during the control loop in question, as shown in block 606, together with an input that is indicative of the number of cylinders, n, in engine 10. The mathematical operators shown in block 608 are applied to these inputs to determine the value of $\dot{P}_m$, which is used in conjunction with the calculation of the partial pressure of air in the intake manifold, as described herein. An air/fuel adjustment factor, $F_{AF}$, may also be calculated as an intermediate value according to the relationship shown in block 610 as a function of $AF_{com(-1)}$, as described in further detail herein.

Effective Intake Mass Air Flow out of Intake Manifold

Figure 8:
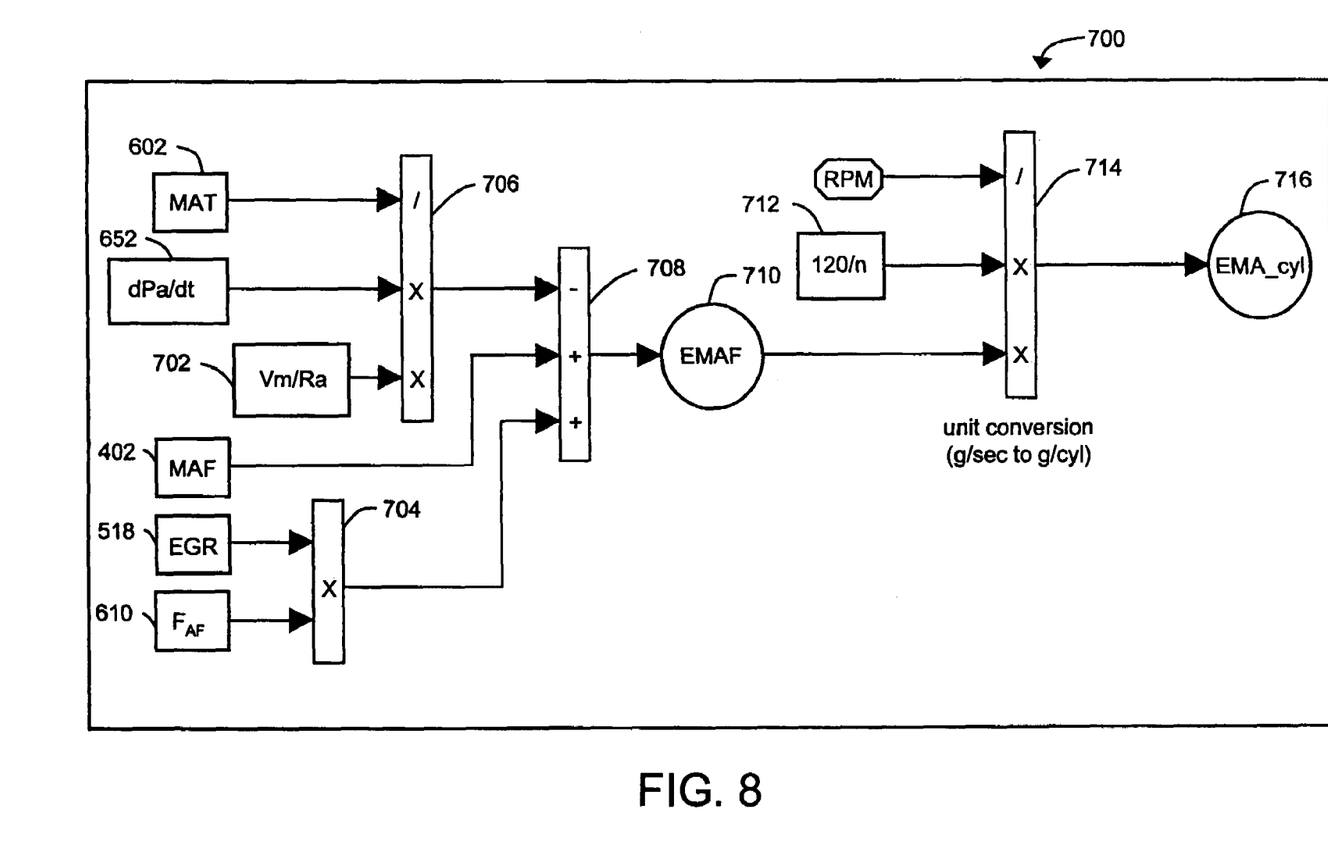
FIG. 8 is block diagram of block 700 of FIG. 5.

Referring to FIGS. 5 and 8, method 300 also includes a step of determining 340 an effective intake mass airflow output 710, $\dot{m}_{eao}$, of the intake airflow out of the intake manifold into the intake port using the intake mass airflow input 402, the EGR mass airflow input 518, the engine state parameters and an air/fuel adjustment factor 610.

A relationship which may be used for the step of determining 340 the effective intake mass airflow output 710 may be derived from dynamic equations for the intake manifold starting with the Ideal Gas law which can be expressed for the mass of air in the intake manifold applying Dalton's law as:

$$P_a V_m = m_{am} R_a T_m = \frac{m_{am}}{M_a} R_u T_m. \quad (5)$$

Equation 5 may also be rearranged as shown below:

$$m_{am} = \frac{P_a V_m}{R_a T_m}. \quad (6)$$

Differentiating equation 6 yields the relationship shown below:

$$\dot{m}_{am} = \frac{V_m}{R_a T_m} \dot{P}_a - \frac{P_a V_m}{R_a T_m^2} \dot{T}_m. \quad (7)$$

The mass flow of the intake air input within the intake manifold may be expressed using the following relationship:

$$\dot{m}_{am} = \dot{m}_{ai} - \dot{m}_{ao}. \quad (8)$$

Substituting equation 7 into equation 8 yields the following:

$$\dot{m}_{ao} = \dot{m}_{ai} + \frac{P_a V_m}{R_a T_m^2} \dot{T}_m - \frac{V_m}{R_a T_m} \dot{P}_a. \quad (9)$$

Applicants have determined that $\dot{T}_m$ is essentially zero with respect to the time interval associated with the airflow associated with any particular $\dot{m}_{ai}$, therefore, the expression in equation 9 may be simplified to:

$$\dot{m}_{ao} = \dot{m}_{ai} - \frac{V_m}{R_a(T_m)} \dot{P}_a. \quad (10)$$

Equation 10 is the expression for the intake mass airflow output, $\dot{m}_{ao}$, of the intake air out of the intake manifold and available for distribution through the intake ports to the combustion chambers of the cylinders.

If the engine 10 is being commanded to a lean-burn condition (i.e., a stratified combustion condition), part of the EGR mass airflow input, $\dot{m}_{egri}$, includes unburned oxygen. In order to properly fuel the engine, it is desirable to adjust $\dot{m}_{ao}$ to add in the unburned oxygen available in the EGR mass airflow to obtain an effective intake mass airflow output 710, $\dot{m}_{eao}$ of the intake air that includes the oxygen available from the EGR mass airflow input, $\dot{m}_{egri}$. The portion of $\dot{m}_{eao}$ available for distribution to each cylinder may then be calculated to obtain an effective mass of intake air per cylinder, $m_{eao\_cyl}$, which may in turn be used for fueling the cylinder, as described further herein.

Applicants have determined empirically that the mass flow of available air (due to unburned oxygen) associated with the EGR mass airflow input, $\dot{m}_{egri}$, particularly under lean-burn engine operating conditions, may be determined by applying an empirically derived air/fuel adjustment factor 610, $F_{AF}$, to $\dot{m}_{egri}$ 518. The air/fuel adjustment factor may be calculated according to the relationship comprising:

$$F_{AF} = \frac{AF_{com(-1)} - AF_{stoich}}{AF_{com(-1)} + 1}, \quad (11)$$

for values of $F_{AF}$, where $1 > F_{AF} \geq 0$. The value of $AF_{stoich}$ is typically about 14.6, as is well-known. The value of $AF_{com(-1)}$ is preferably selected to be an air/fuel ratio command associated in time with a combustion event associated with a particular portion or value of $\dot{m}_{egri}$. For lean-burn combustion conditions, the values of the air/fuel ratios associated with $AF_{com(-1)}$ typically range from about 14.6–40/1.

Figure 6:
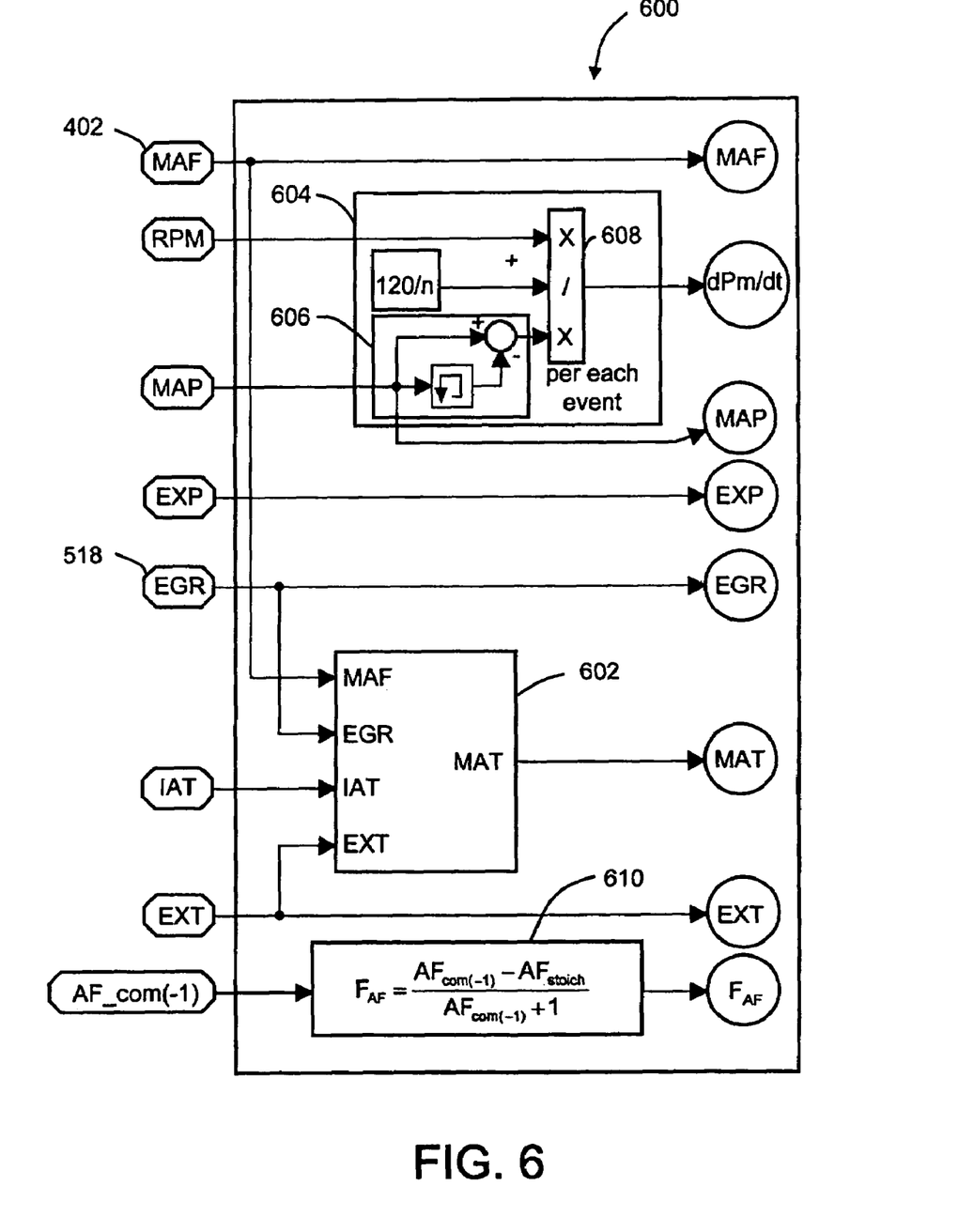
FIG. 6 is block diagram of block 600 of FIG. 5.

Once $F_{AF}$ has been determined, as illustrated in FIG. 6, the effective intake mass airflow output, $\dot{m}_{eao}$, of the intake air may be calculated by adding the EGR mass airflow input, $\dot{m}_{egri}$, from equation 4, factored by the fuel air adjustment factor, $F_{AF}$, from equation 11, to the intake mass airflow output from equation 4, according to the relationship comprising:

$$\dot{m}_{eao} = \dot{m}_{ai} - \frac{V_m}{R_a(T_m)} \dot{P}_a + F_{AF}(\dot{m}_{egri}). \quad (12)$$

The effective mass of the intake air available at the intake port for each cylinder, $m_{eao\_cyl}$, may then be calculated from $\dot{m}_{eao}$ by taking into consideration engine speed, $N_e$, the number of cylinders, n, and a constant related to the type of the engine (i.e., 2 cycle (60) or 4 cycle (120)), according to the relationship comprising:

$$m_{\text{eao\_cyl}} = \left[\dot{m}_{ai} - \frac{V_m}{R_a(T_m)}\dot{P}_a + F_{AF}(\dot{m}_{egri})\right]\frac{120}{n(N_e)}. \quad (13)$$

Figure 10:
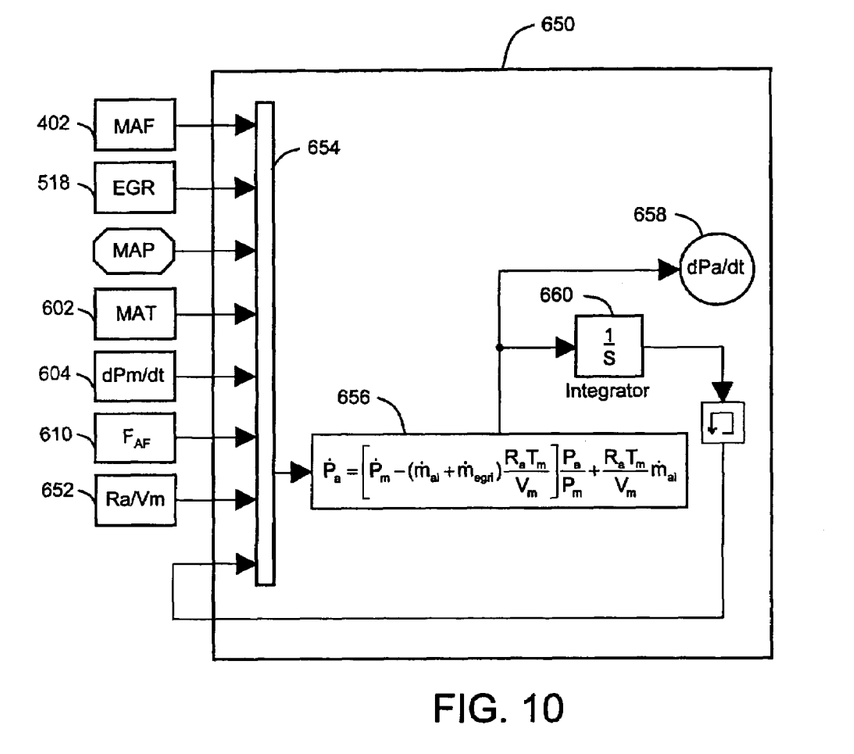
FIG. 10 is block diagram of block 650 of FIG. 5.

Referring to FIGS. 5 and 8, the calculation of the effective intake mass airflow output, $\dot{m}_{eao}$, in accordance with equation 12, and the effective mass of air available per cylinder, $m_{eao}$ are illustrated as block 700 of port flow estimator algorithm 218. Referring to FIGS. 5 and 8, the value of MAF or $\dot{m}_{ai}$ 402 is obtained from block 400. The value of $dP_a/dt$ 658 is obtained from block 650 as illustrated in FIGS. 5 and 10, and described herein. The value of MAT is obtained from block 602 as illustrated in FIG. 6. A quantity $V_m/R_a$ is calculated in block 702 from stored or calibration values associated with $V_m$ and $R_a$ in estimator 216 or controller 214. Referring to FIGS. 6 and 7, the values of EGR or $\dot{m}_{egri}$ 518 from block 500 and $F_{AF}$ from block 610 are combined in accordance with the mathematical operators set forth in block 704. The values of MAT, $dP_a/dt$ 658 and the quantity obtained from block 702 are combined in accordance with the mathematical operators set forth in block 706. MAF, the output from block 704 and the output from block 706 are combined in accordance with the mathematical operators set forth in block 708. The output from block 708 is the effective intake mass airflow output 710, $m_{eao}$, from the intake manifold. The effective intake mass airflow output 710 is combined with a quantity calculated in block 712 as a function of the number of cylinders in the engine and the engine speed, RPM, in accordance with the mathematical operators set forth in block 714 to determine the effective mass of intake air output per cylinder 716, $m_{eao}$.

EGR Mass Air Flow out of Intake Manifold

Similarly to equation 5, the mass flow of EGR gases within the intake manifold may be expressed by applying Dalton's law and the Ideal Gas law as follows:

$$P_{egr}V_m = (P_m - P_a)V_m = m_{egrm}R_eT_m = \frac{m_{egrm}}{M_{egr}}R_uT_m. \quad (14)$$

Equation 14 may then be rearranged in the following form:

$$m_{egrm} = \frac{(P_m - P_a)V_m}{R_eT_m}. \quad (15)$$

The mass flow of EGR gases within the intake manifold may be determined by differentiating equation 15, as follows:

$$\dot{m}_{egrm} = \frac{V_m}{R_eT_m}(\dot{P}_m - \dot{P}_a) - \frac{(P_m - P_a)V_mM_{egr}}{R_uT_m^2}\dot{T}_m. \quad (16)$$

The mass flow of EGR gases within the intake manifold may also be expressed as:

$$\dot{m}_{egrm}\dot{m}_{egri}-\dot{m}_{egro}. \quad (17)$$

By substituting equation 16 into equation 17, the following relationship is obtained:

$$\dot{m}_{egro} = \dot{m}_{egri} + \frac{(P_m - P_a)V_m}{R_eT_m^2}\dot{T}_m - \frac{V_m}{R_eT_m}(\dot{P}_m - \dot{P}_a). \quad (18)$$

As described above, applicants have determined that $\dot{T}_m$ is essentially zero with respect to the time interval associated with the airflow associated with any particular $\dot{m}_{egri}$, therefore, the expression in equation 18 may be simplified to:

$$\dot{m}_{egro} = \dot{m}_{egri} - \frac{V_m}{R_eT_m}(\dot{P}_m - \dot{P}_a). \quad (19)$$

As described above, if the engine 10 is being commanded to a lean-burn condition (i.e., a stratified combustion condition), part of the EGR mass airflow input, $\dot{m}_{egri}$, includes unburned oxygen. In order to properly fuel the engine, it is desirable to adjust $\dot{m}_{ao}$ to add in the unburned oxygen available in the EGR mass airflow to obtain an effective intake mass airflow output 710, $\dot{m}_{eao}$ of the intake air that includes the oxygen available from the EGR mass airflow input, $\dot{m}_{egri}$. In order to determine the effective EGR mass airflow, the portion of the EGR mass airflow added to the intake mass airflow must be reduced from the EGR mass airflow. The effective EGR mass airflow may then be expressed as:

$$\dot{m}_{eegro} = \dot{m}_{egri}(1 - F_{AF}) - \frac{V_m}{R_eT_m}(\dot{P}_m - \dot{P}_a). \quad (20)$$

The effective mass of the EGR gases available at the intake port for each cylinder, $m_{eegr\_cyl}$, may then be calculated by taking into consideration engine speed, $N_e$, and the number of cylinders, n, and an engine speed related conversion constant related to the type of the engine (i.e., 2 cycle (60) or 4 cycle (120)), according to the relationship comprising:

$$m_{eegro\_cyl} = \left[\dot{m}_{egri}(1 - F_{AF}) - \frac{V_m}{R_eT_m}(\dot{P}_m - \dot{P}_a)\right]\frac{120}{n(N_e)}. \quad (21)$$

Figure 9:
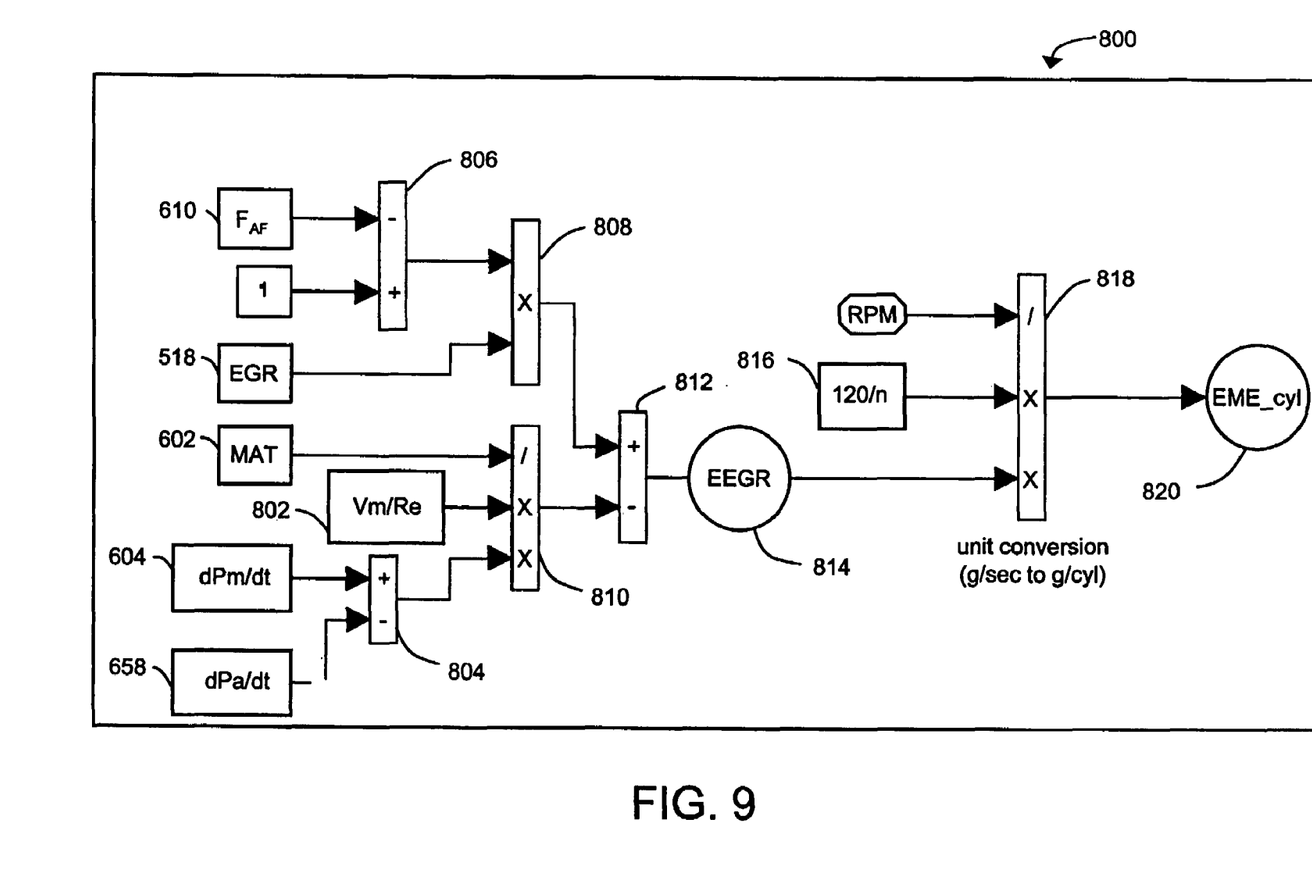
FIG. 9 is block diagram of block 800 of FIG. 5.

Referring to FIGS. 5 and 9, the calculation of the effective EGR mass airflow output, $\dot{m}_{eegro}$, in accordance with equation 20, and the effective mass of EGR gases available per cylinder, $m_{eegro\_cyl}$, in accordance with equation 21, are illustrated as block 800 of port flow estimator algorithm 218. A quantity $V_m/R_e$ is calculated in block 702 from stored or calibration values associated with $V_m$ and $R_e$ in estimator or controller 214. The values of $dP_a/dt$ 658 and $dP_m/dt$ 608 are combined in accordance with the mathematical operators of block 804. The value of MAT is obtained from block 602 as illustrated in FIG. 6. The output of blocks 702 and 704 and the value of MAP are combined in accordance with the mathematical operators set forth in block 810. The value of $F_{AF}$ from block 610 is subtracted from 1 in accordance with the mathematical operators of block 806. The value of EGR or $\dot{m}_{egri}$ 518 from block 500 is combined with the value obtained from block 806 in accordance with the mathematical operators set forth in block 808. The outputs from blocks 808 and 810 are combined in accordance with the mathematical operators set forth in block 812 to produce as an output the effective EGR mass airflow output 814 from the intake manifold. The effective EGR mass airflow output 814, $\dot{m}_{eegro}$, is combined with a quantity calculated in block 816 as a function of the number of cylinders in the engine and the engine speed, RPM, in accordance with the mathematical operators set forth in block 818 to determine the effective mass of EGR gas output per cylinder 820, $m_{eegro\_cyl}$.

Partial Pressure of Intake Air in Manifold

In order to utilize the expressions set forth in equations 12, 13, 20 and 21, it is necessary to determine the partial pressure of intake air in the intake manifold. An expression for the partial pressure of air may be obtained in the manner described further below.

The following relationship is based upon the direct mixing assumption:

$$\frac{\dot{m}_{egro}}{\dot{m}_{ao}} = \frac{m_{egro}}{m_{ao}} = \frac{M_{egr}(P_m - P_a)}{M_a P_a} \rightarrow \dot{m}_{egro} P_a = \dot{m}_{ao}(P_m - P_a). \quad (22)$$

Applicants have determined that for typical exhaust gases and intake air, the molecular weights are approximately equal. Assuming that $M_{egr} = M_a$, and substituting equation 9 and equation 18 into equation 22 yields the following expression:

$$\dot{m}_{egri} P_a + \frac{(P - P_a) V_m M_a}{R_u T_m^2} \dot{T}_m P_a - \frac{V_m M_a}{R_u T_m} (\dot{P}_m - \dot{P}_a) P_a = \quad (23)$$

$$\dot{m}_{ai}(P_m - P_a) + \frac{P_a V_m M_a}{R_u T_m^2} \dot{T}_m (P_m - P_a) - \frac{V_m M_a}{R_u T_m} \dot{P}_a (P_m - P_a).$$

Rearranging equation 23, yields the following expression:

$$\frac{V_m M_a}{R_u T_m} P_a \dot{P}_a + \frac{V_m M_a}{R_u T_m} P_m \dot{P}_a - \frac{V_m M_a}{R_u T_m} P_a \dot{P}_a = \quad (24)$$

$$\frac{V_m M_a}{R_u T_m} \dot{P}_m P_a - \dot{m}_{egri} P_a - \frac{V_m M_a}{R_u T_m^2} \dot{T}_m P_m P_a + \frac{V_m M_a}{R_u T_m^2} \dot{T}_m P_a^2 +$$

$$\dot{m}_{ai} P_m - \dot{m}_{ai} P_a + \frac{V_m M_a}{R_u T_m^2} \dot{T}_m P_m P_a - \frac{V_m M_a}{R_u T_m^2} \dot{T}_m P_a^2.$$

Simplifying the equation and subtracting like terms yields the following form:

$$\frac{V_m M_a}{R_u T_m} P_m \dot{P}_a = \frac{V_m M_a}{R_u T_m} \dot{P}_m P_a - \dot{m}_{egri} P_a + \dot{m}_{ai} P_m - \dot{m}_{ai} P_a. \quad (25)$$

Rearranging equation 25 yields the following expression:

$$\dot{P}_a = \frac{\dot{P}_m}{P_m} P_a - \frac{R_u T_m}{V_m M_a P_m} \dot{m}_{egri} P_a + \frac{R_u T_m}{V_m M_a P_m} \dot{m}_{ai}(P_m - P_a). \quad (26)$$

Equation 26 may be rearranged to describe the dynamics associated with the rate of change of the partial pressure of the intake airflow input within the intake manifold. Substituting $$R_a \text{ for } \frac{R_u}{M_a},$$

the expression takes the form:

$$\dot{P}_a = \left[\dot{P}_m - (\dot{m}_{ai} + \dot{m}_{egri}) \frac{R_a T_m}{V_m}\right] \frac{P_a}{P_m} + \frac{R_a T_m}{V_m} \dot{m}_{ai}. \quad (27)$$

Referring to FIGS. 4, 5 and 10, the calculation of the derivative of the partial pressure of intake air in the intake manifold associated with the intake air input is illustrated in block 650 of integrator 218. The inputs for this calculation comprise MAF, EGR, MAP, MAT, $dP_m/dt$, $F_{AF}$, the quantity $$\frac{R_a}{V_m} \text{ and } P_a.$$

Referring to FIGS. 5 and 10, the value of MAF 402 is obtained from block 400, as described herein. The value of EGR 518 is obtained from block 500, as described herein and illustrated in FIGS. 5 and 7. The value of MAP may be obtained as described herein and illustrated in FIGS. 5 and 6. The value of MAT may be calculated as described herein and illustrated in block 602 of FIG. 6. The value of $dP_m/dt$ or $\dot{P}_m$ may be calculated as described herein and illustrated in block 604 of FIG. 6. The value of $F_{AF}$ may be calculated as described herein and illustrated in block 610 of FIG. 6. The value of the quantity $$\frac{R_a}{V_m}$$

may be calculated as a precursor step from stored or calibration values of $R_a$ and $V_m$ as shown in block 652 of FIG. 10. The inputs provided to block 654 are applied to the function used to calculate $dP_a/dt$ as illustrated in block 656. The value of $dP_a/dt$ is available for use in conjunction with the steps of method 300 as output 658. The value of $dP_a/dt$ may also be integrated by application of an integrator as shown in block 660 to provide a value of $P_a$ for each control loop associated with the calculation of $dP_a/dt$. This value of $P_a$ is also provided via feedback as an input to block 652. The values of $dP_a/dt$ are provided to block 700 for the calculation of the effective intake mass airflow 710, $\dot{m}_{eoa}$ or EMAF, and the effective intake mass air output per cylinder 716, $\dot{m}_{eao\_cyl}$ or EMA_cyl, and block 800 for the calculation of the effective EGR mass airflow output, $\dot{m}_{eegro}$ or EEGR, and the effective EGR gas mass output per cylinder 820, EME_cyl, as illustrated in FIG. 5 and described herein.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

What is claimed is:

1. A method of determining an intake port mass airflow in an internal combustion engine having an intake system, a combustion chamber comprising a cylinder which is adapted for direct injection of a fuel and an exhaust system, the engine adapted for combustion of stoichiometric and non-stoichiometric air/fuel mixtures, the intake system having an intake air throttle to throttle an intake airflow input into an intake manifold for distribution to an intake port having an intake valve for directing an intake port airflow output into the combustion chamber, the combustion chamber operatively connected to the exhaust system for removal of an exhaust airflow through an exhaust port having an exhaust valve and an exhaust gas recirculation (EGR) conduit which is adapted to return a portion of the exhaust airflow through an EGR valve as an EGR airflow input into the intake manifold, the method comprising:

determining an intake mass airflow input ($\dot{m}_{ai}$) of the intake airflow input into the intake manifold;

determining an EGR mass airflow input ($\dot{m}_{egri}$) of the EGR airflow input into the intake manifold;

determining a plurality of engine state parameters related to the intake airflow and the EGR airflow into the intake manifold; and determining an effective intake mass airflow output ($\dot{m}_{eao}$) of the intake airflow out of the intake manifold into the intake port using the intake mass airflow input, the EGR mass airflow input, the engine state parameters and an air/fuel adjustment factor ($F_{AF}$).

2. The method of claim 1, wherein the engine state parameters comprise an intake manifold air temperature ($T_m$), an intake manifold air volume ($V_m$), an intake manifold air pressure ($P_m$) and a partial pressure of the intake airflow in the intake manifold ($P_a$).

3. The method of claim 2, wherein determining the effective intake mass airflow output comprises calculating the effective intake mass airflow output as a predetermined function of the intake mass airflow input, the engine state parameters, a derivative of the partial pressure of the intake airflow ($\dot{P}_a$) in the intake manifold and the air/fuel adjustment factor.

4. The method of claim 3, wherein the air fuel adjustment factor is calculated as a predetermined function of a commanded air/fuel ratio ($AF_{com(-1)}$) and a stoichiometric air/fuel ratio ($AF_{stoich}$), and wherein the commanded air/fuel ratio is associated with the EGR mass airflow input.

5. The method of claim 4, wherein calculating the effective intake mass airflow output as a predetermined function of the intake mass airflow input, the engine state parameters, the derivative of the partial pressure of the intake airflow in the intake manifold and the air/fuel adjustment factor is performed according to a relationship comprising:

$$\dot{m}_{eao} = \dot{m}_{ai} - \frac{V_m M_a}{R_u T_m} \dot{P}_a + F_{AF}(\dot{m}_{egri}),$$

where:

$M_a$ is the molecular weight of the intake air, and $R_u$ is the universal gas constant.

6. The method of claim 5, wherein the air/fuel adjustment factor is calculated according to a relationship comprising:

$$F_{AF} = \frac{AF_{com(-1)} - AF_{stoich}}{AF_{com(-1)} + 1}.$$

7. The method claim 4, wherein the derivative of the partial pressure of the intake airflow in the intake manifold is calculated as a predetermined function of the intake mass airflow input, the EGR mass airflow input, the engine state parameters and a rate of change of the intake manifold pressure.

8. The method of claim 2, wherein the engine state parameters further comprise an exhaust manifold pressure ($P_{exh}$), an exhaust manifold temperature ($T_{exh}$), and an EGR valve effective area ($A_{egr\_eff}$), and determining an EGR mass airflow input comprises calculating the EGR airflow input as a predetermined function of the exhaust manifold pressure, exhaust manifold temperature, intake manifold pressure and the EGR valve effective area.

9. The method of claim 8, wherein calculating the EGR airflow input as a predetermined function of the exhaust manifold pressure, exhaust manifold temperature and EGR valve effective area, is performed according to the relationship comprising:

$$\dot{m}_{egr} = \frac{\Phi(P_{exh})(A_{egr\_eff})}{\sqrt{R * T_{exh}}},$$

where:

$\Phi$ is a predetermined function of a ratiometric relationship of intake manifold pressure and exhaust manifold pressure associated with the EGR valve.

10. The method of claim 1, further comprising determining an effective mass of intake air per cylinder ($m_{eao}$) from the effective intake mass airflow output ($\dot{m}_{eao}$).

11. The method of claim 10, further comprising determining a fuel input to the combustion chamber in response to the effective mass of intake air per cylinder.

12. The method of claim 6, further comprising determining an effective mass of intake air per cylinder ($m_{eao}$) from the effective intake mass airflow output ($\dot{m}_{eao}$).

13. The method of claim 12, wherein the effective mass of intake air per cylinder ($m_{eao}$) is calculated according to a relationship comprising:

$$m_{eao\_cyl} = \left[\dot{m}_{ai} - \frac{V_m M_a}{R_u T_m} \dot{P}_a + F_{AF}(\dot{m}_{egri})\right] \frac{120}{n(N_e)},$$

where:

n is the number of cylinders of the engine, and $N_e$ is the engine speed.

14. The method of claim 13, further comprising determining a fuel input to the combustion chamber in response to the effective mass of intake air per cylinder.

15. A method of determining intake port mass airflow in an internal combustion engine having an intake system, a combustion chamber comprising a cylinder which is adapted for direct injection of a fuel and an exhaust system, the engine adapted for combustion of stoichiometric and non-stoichiometric air/fuel mixtures, the intake system having an intake air throttle to throttle an intake airflow input into an intake manifold for distribution to an intake port having an intake valve for directing an intake port airflow output into the combustion chamber, the combustion chamber operatively connected to the exhaust system for removal of an exhaust airflow through an exhaust port having an exhaust valve and an exhaust gas recirculation (EGR) conduit which is adapted to return a portion of the exhaust airflow through an EGR valve as an EGR airflow input into the intake manifold, the method comprising:

determining an intake mass airflow input of the intake airflow input into the intake manifold;

determining an EGR mass airflow input of the EGR airflow input into the intake manifold;

determining a plurality of engine state parameters related to the intake airflow and the EGR airflow into the intake manifold; and determining an intake port mass airflow output using the intake mass airflow input, the EGR mass airflow input, the engine state parameters and an air/fuel adjustment factor.

16. The method of claim 15, wherein the engine state parameters comprise an intake manifold air temperature ($T_m$), an intake manifold air volume ($V_m$), an intake manifold air pressure ($P_m$) and a partial pressure of the intake airflow in the intake manifold ($P_a$).

17. The method of claim 16, wherein determining the intake port mass airflow output further comprises determining an effective intake mass airflow output of the intake airflow out of the intake manifold into the intake port and determining an effective EGR mass airflow output of the EGR airflow out of the intake manifold into the intake port.

18. The method of claim 17, wherein determining the effective intake mass airflow output comprises calculating the effective intake mass airflow output as a predetermined function of the intake mass airflow input, the engine state parameters, a derivative of the partial pressure of the intake airflow in the intake manifold and the air/fuel adjustment factor.

19. The method of claim 18, wherein the air fuel adjustment factor is calculated as a predetermined function of a commanded air/fuel ratio ($AF_{com(-1)}$) and a stoichiometric air/fuel ratio ($AF_{stoich}$), and wherein the commanded air/fuel ratio is associated with the EGR mass airflow input.

20. The method of claim 19, wherein calculating the effective intake mass airflow output as a predetermined function of the intake mass airflow input, the engine state parameters, the rate of change of the partial pressure of the intake airflow in the intake manifold and the air/fuel adjustment factor is performed according to a relationship comprising:

$$\dot{m}_{eao} = \dot{m}_{ai} - \frac{V_m M_a}{R_u T_m} \dot{P}_a + F_{AF}(\dot{m}_{egri}),$$

where the air/fuel adjustment factor is calculated according to a relationship comprising:

$$F_{AF} = \frac{AF_{com\_egr} - AF_{stoich}}{AF_{com\_egr} + 1},$$

and where:
$M_a$ is the molecular weight of the intake air, and
$R_u$ is the universal gas constant.

21. The method claim 19, wherein the derivative of the partial pressure of the intake airflow in the intake manifold is calculated as a predetermined function of the intake mass airflow input, the EGR mass airflow input, the engine state parameters and a rate of change of the intake manifold pressure.

22. The method of claim 17, wherein determining an effective EGR mass airflow output of the EGR airflow out of the intake manifold into the intake port is performed by calculating the effective EGR mass airflow output as a predetermined function of the EGR mass airflow input, the engine state parameters, a rate of change of the manifold temperature, a rate of change of the partial pressure of the intake airflow in the intake manifold and a rate of change of the intake manifold pressure.

23. The method of claim 22, wherein the air fuel adjustment factor is calculated as a predetermined function of a commanded air/fuel ratio ($AF_{com(-1)}$) and a stoichiometric air/fuel ratio ($AF_{stoich}$), and wherein the commanded air/fuel ratio is associated with the EGR mass airflow input.

24. The method of claim 23, wherein calculating the effective EGR mass airflow output as a predetermined function of the EGR mass airflow input, the engine state parameters, the rate of change of the manifold temperature, the rate of change of the partial pressure of the intake airflow in the intake manifold and the rate of change of the intake manifold pressure is performed according to a relationship comprising:

$$\dot{m}_{eegro} = \dot{m}_{egri}(1 - F_{AF}) - \frac{V_m M_{egr}}{R_u T_m}(\dot{P}_m - \dot{P}_a),$$

where the air/fuel adjustment factor is calculated according to a relationship comprising:

$$F_{AF} = \frac{AF_{com(-1)} - AF_{stoich}}{AF_{com(-1)} + 1},$$

and where:
$M_e$ is the molecular weight of the exhaust gas, and
$R_u$ is the universal gas constant.

25. The method claim 23, wherein the rate of change of the partial pressure of the intake airflow in the intake manifold is calculated as a predetermined function of the intake mass airflow input, the EGR mass airflow input, the engine state parameters and a rate of change of the intake manifold pressure.

26. The method of claim 16, wherein the engine state parameters further comprise an exhaust manifold pressure, an exhaust manifold temperature, and an EGR valve effective area, and determining an EGR mass airflow input comprises calculating the EGR airflow input as a predetermined function of the exhaust manifold pressure, exhaust manifold temperature, intake manifold pressure and the EGR valve effective area.

27. The method of claim 26, wherein calculating the EGR airflow input as a predetermined function of the exhaust manifold pressure, exhaust manifold temperature and EGR valve effective area, is performed according to the relationship comprising:

$$\dot{m}_{egr} = \frac{\Phi(P_{exh})(A_{eff})}{\sqrt{R * T_{exh}}},$$

wherein
$\Phi$ is a predetermined function of a ratiometric relationship of intake manifold pressure and exhaust manifold pressure associated with the EGR valve.

* * * * *